US007284429B2

(12) United States Patent
Chaumet et al.

(10) Patent No.: US 7,284,429 B2
(45) Date of Patent: Oct. 23, 2007

(54) MICROMACHINED DOUBLE TUNING-FORK GYROMETER WITH DETECTION IN THE PLANE OF THE MACHINED WAFER

(76) Inventors: Bernard Chaumet, 6 rue Gustave Courbet, Chatellerault (FR) 86100; Bertrand Leverrier, 15 rue Chantebise, Montelier (FR) 26120; Claude Rougeot, 6 Cours Gambetta, Lyon (FR)

( * ) Notice: Subject to any disclaimer, the term of this patent is extended or adjusted under 35 U.S.C. 154(b) by 217 days.

(21) Appl. No.: 10/929,398

(22) Filed: Aug. 31, 2004

(65) Prior Publication Data

US 2005/0050954 A1 Mar. 10, 2005

(30) Foreign Application Priority Data

Sep. 9, 2003 (FR) .................................. 03 10609

(51) Int. Cl.
*G01C 19/00* (2006.01)
*G01P 15/08* (2006.01)
*G01P 3/44* (2006.01)
*G01P 9/00* (2006.01)

(52) U.S. Cl. ................................. 73/504.12; 73/504.16

(58) Field of Classification Search ............. 73/504.12, 73/504.15, 504.16; 310/329, 370
See application file for complete search history.

(56) References Cited

U.S. PATENT DOCUMENTS

| 5,706,252 | A | 1/1998 | Le Verrier et al. ......... 73/31.05 |
| 6,647,759 | B2 | 11/2003 | Leverrier et al. ........... 367/152 |
| 6,691,571 | B2* | 2/2004 | Willig et al. ............. 73/504.12 |
| 6,705,164 | B2* | 3/2004 | Willig et al. ............. 73/504.12 |
| 6,877,374 | B2* | 4/2005 | Geen ....................... 73/504.14 |

* cited by examiner

*Primary Examiner*—Hezron Williams
*Assistant Examiner*—Tamiko Bellamy
(74) *Attorney, Agent, or Firm*—Lowe Hauptman & Berner, LLP

(57) ABSTRACT

The invention relates to a gyrometer based on a vibrating structure, produced by micromachining in a thin planar wafer. It comprises four moving assemblies placed at the vertices of a virtual rectangle, each moving assembly being coupled to two moving assemblies located at neighboring vertices via a coupling structure and comprising an inertial first moving element connected to the coupling structure and intended to vibrate in two orthogonal directions in the plane of the wafer, namely an excitation direction and a detection direction, and a second moving element intended to vibrate in the detection direction and connected, on one side, to the first moving element and, on the other side, to anchoring zones via linking means.

21 Claims, 8 Drawing Sheets

_US 7,284,429 B2_

MICROMACHINED DOUBLE TUNING-FORK GYROMETER WITH DETECTION IN THE PLANE OF THE MACHINED WAFER

RELATED APPLICATIONS

The present application is based on, and claims priority from France Application Number 03 10609, filed Sep. 9, 2003, the disclosure of which is hereby incorporated by reference herein in its entirety.

FIELD OF THE INVENTION

The invention relates to inertial sensors intended for measuring angular velocities, or gyrometers, and more precisely to gyrometers that are micromachined using the technologies of etching, deposition, doping, etc., these being similar to those used in the field of integrated electronic circuits.

Such micromachined inertial sensors produced on a silicon or quartz wafer are already known. The structure is planar in the plane of the silicon or quartz wafer in which it is etched.

Structures based on two vibrating masses mechanically coupled in the manner of a tuning fork have already been produced. The structure of a gyrometer thus produced typically comprises two moving masses that are excited in vibration and connected as a tuning fork, that is to say the two masses are connected to a central coupling structure that transfers the vibration energy from the first mass to the second mass, and vice versa.

The masses are excited into vibration in the plane of the wafer by an electrical excitation structure. This vibration in the plane of the wafer is exerted perpendicular to an axis called the "sensitive axis" of the gyrometer, perpendicular to the direction of this vibration. When the gyrometer rotates at a certain angular velocity about its sensitive axis, the composition of the forced vibration with the angular rotation vector generates, by the Coriolis effect, forces that set the moving masses into natural vibration perpendicular to the excitation vibration and to the axis of rotation; the amplitude of this natural vibration is proportional to the speed of rotation.

The natural vibration is detected by an electrical detection structure. The electrical signals that result therefrom are used to deduce from them a value of the angular velocity about the sensitive axis.

In certain cases the sensitive axis lies in the plane of the wafer and the detection structure detects a movement perpendicular to the plane of the moving masses. In other cases, the sensitive axis of the gyrometer is the axis Oz perpendicular to the plane of the wafer. The excitation movement of the moving masses is generated in a direction Ox of the plane, while a movement resulting from the Coriolis force is detected in a direction Oy, perpendicular to Ox, in the same plane.

The masses are capable of vibrating in two orthogonal vibration modes—the excitation mode, also called the primary mode, and the detection mode, also called the secondary mode.

The tuning-fork architecture has a drawback: the secondary mode is not in dynamic equilibrium. Consequently, this mode transmits a moment to the support of the tuning fork, which makes this mode sensitive to the conditions of attachment to the support and sensitive to the external perturbations transmitted by the support.

To remedy this problem, one solution consists in isolating the secondary mode using a double tuning-fork structure as shown in FIG. 1. In the primary mode, the two tuning forks vibrate in opposition, that is to say when the two branches of one tuning fork are "moving in", the other two are "moving out". When the gyrometer rotates about the axis of the foot of the double tuning fork, the Coriolis forces generated on each of the branches have a resultant zero moment and therefore do not transmit load to the foot of the double tuning fork: the secondary mode, the movement of which is indicated in FIG. 1, is then not very sensitive to the external perturbations and to the conditions of attachment to the support. Such a structure is described in patent EP 0578 519.

This double-fork structure has the drawback of being three-dimensional; it can be produced only by conventional techniques and not by collective micromachining techniques, thereby making it expensive to fabricate.

SUMMARY OF THE INVENTION

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

One object of the invention is to propose a double tuning-fork gyrometer structure that is less expensive to fabricate. Another object is to propose a structure that also allows a rotation measurement with very high sensitivity and very high linearity, and with minimal perturbations due to the excitation movement or to other effects.

To achieve this object, the invention proposes a gyrometer based on a vibrating structure, produced by micromachining in a thin planar wafer which principally comprises four moving assemblies placed at the vertices of a virtual rectangle, each moving assembly being coupled to two moving assemblies located at neighboring vertices via a coupling structure in order to allow transfer of mechanical vibration energy between them, each moving assembly comprising a first inertial moving element connected to the coupling structure and intended to vibrate in two orthogonal directions in the plane of the wafer, namely a first direction, called the excitation direction, and a second direction, called the detection direction, a second moving element intended to vibrate in the detection direction without permitting movement of the second element in the excitation direction and connected, on one side, to the first moving element, and, on the other side, to anchoring zones via linking means which allow transmission to the second moving element of the vibration movement of the first moving element in the detection direction.

According to one feature of the invention, the first moving element is a frame, preferably rectangular, surrounding the second moving element called the detection mass.

The detection mass is advantageously connected to the frame by at least two straight and elongate first flexure arms which have a high resistance to elongation in the detection direction and a low stiffness in the excitation direction, and the detection mass is connected to at least one anchoring zone by at least two second narrow and elongate flexure arms which have a high resistance to elongation in the excitation direction and a low stiffness in the detection direction.

The sides of the rectangle are preferably parallel to Ox and Oy respectively.

According to one feature of the invention, the gyrometer has an axis of symmetry A3 lying in the plane of the wafer and along Oy, such that the excitation vibrations of the first moving elements of two moving assemblies that are located on one side of the axis A3 are symmetrical with respect to the excitation vibrations of the first moving elements of the two other moving assemblies that are located on the other side of this axis A3.

Likewise, it has an axis of symmetry A4 lying in the plane of the wafer and along Ox, such that the detection vibrations of the second moving elements of two moving assemblies that are located on one side of the axis A4 are symmetrical with respect to the detection vibrations of the second moving elements of the two other moving assemblies that are located on the other side of this axis A4.

The rectangle may be a square, the diagonals of which are parallel to Ox and Oy respectively.

The moving assemblies are arranged so that the excitation direction is parallel to Ox in the case of two first elements located at the vertices of the diagonal along Ox and is parallel to Oy in the case of the two first elements located at the vertices of the diagonal along Oy, or are pivoted through 90°.

According to one feature of the invention, the gyrometer has an axis of symmetry A3 lying in the plane of the wafer and oriented at ±45° with respect to Ox, such that the excitation vibrations of the first moving elements of two moving assemblies that are located on one side of the axis A3 are symmetrical with respect to the excitation vibrations of the first moving elements of the two other moving assemblies that are located on the other side of this axis A3.

Likewise, it has an axis of symmetry A4 lying in the plane of the wafer and oriented at ±45° with respect to Ox, such that the detection vibrations of the second moving elements of two moving assemblies that are located on one side of the axis A4 are symmetrical with respect to the detection vibrations of the second moving elements of the two other moving assemblies that are located on the other side of this axis A4.

BRIEF DESCRIPTION OF THE DRAWINGS

Other features and advantages of the invention will become apparent on reading the detailed description that follows, this being given by way of nonlimiting example and with reference to the appended drawings in which.

DETAILED DESCRIPTION OF THE INVENTION

Figure 1:
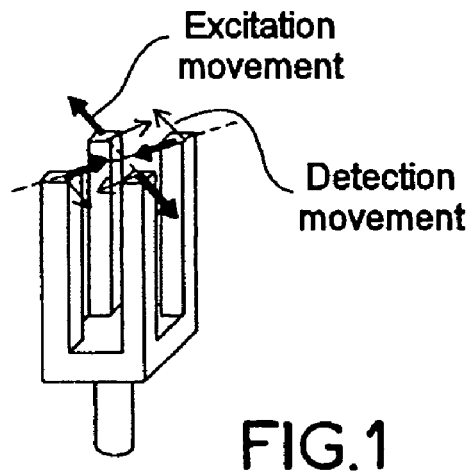
FIG. 1, already described, shows schematically a three-dimensional double tuning-fork structure having two forks.

A thin planar silicon wafer is machined according to the invention in order to make a gyrometer whose sensitive axis is perpendicular to the plane of the wafer.

Silicon is chosen as preferred material, on the one hand for its mechanical properties and on the other for its high conductivity when it is sufficiently doped with an appropriate impurity (in general, boron in the case of p-type silicon). Conductive silicon makes it possible to produce the electrical functions of the gyrometer and especially the excitation functions and the detection functions; these functions are performed by interdigitated capacitive combs supplied with electrical current or voltage; the fingers of these combs, directly machined in the conductive silicon, serve as plates of capacitors useful for the excitation functions and for the detection functions.

The thickness of the starting silicon wafer is, for example, a few hundred microns; the wafer has, on the one hand, fixed anchoring zones formed in this thickness and, on the other hand, the actual vibrating structure, which is free relative to the anchoring zones and formed within a smaller thickness, for example within a thickness of around sixty microns, isolated from the rest of the thickness of the wafer by a narrow gap. The silicon wafer is cut by micromachining, within this thickness of around sixty microns, into the desired detection mass features, moving frame, coupling structure, flexure arms and interdigitated combs.

The machining of the structure may be carried out using, as starting substrate, a silicon-on-insulator substrate, but other methods are also possible. A silicon-on-insulator substrate consists of a silicon substrate a few hundred microns in thickness that bears, on its front face, a thin layer of silicon oxide, which is itself covered with a layer of single-crystal silicon a few tens of microns in thickness. The machining consists in etching the silicon of the substrate via its front face, into the desired surface features, by means of photoetching techniques commonly employed in microelectronics, until the oxide layer is reached, with a selective etchant that etches the silicon without significantly etching the oxide. The etching is stopped when the oxide layer is bared. This oxide layer is then removed by selective etching using another etchant so as retain only the single-crystal silicon surface layer, except at the place of the anchoring zones where the oxide layer remains and forms a joint link between the substrate and the single-crystal silicon surface layer. The machining via the front face defines the various recesses for the moving parts. It is therefore these surface features, anchoring zones and recesses for the moving parts that may be seen in the figures.

The general structure of the gyrometer is a structure of the double tuning-fork type, that is to say a symmetrical structure comprising four inertial moving assemblies vibrating in phase opposition pairwise, these moving assemblies being connected together by a coupling structure serving to transmit, without any losses, from one assembly to the other, the mechanical vibration energies of the four assemblies. The inertial assemblies are located at the vertices of a virtual rectangle, which may be square. The symmetry of the structure is a symmetry with respect to an axis A1 and with respect to an axis A2 that lie in the plane of the wafer, A2 being perpendicular to A1, with, in both cases, two moving assemblies on each side of the axis.

Furthermore, each vibration mode has an axis of symmetry, namely an axis A3 in the case of the excitation mode and an axis A4 in the case of the detection mode, which lie in the plane of the wafer, and such that two moving assemblies located on one side of the axis A3, or alternatively A4, vibrate symmetrically with respect to the two other moving assemblies located on the other side of this axis. As will be seen below, these axes A3 and A4 may be coincident with A1 or A2.

Each inertial assembly comprises, as first moving element, an inertial frame and, as second moving element, a central inertial moving mass surrounded by the frame.

Figure 2A:
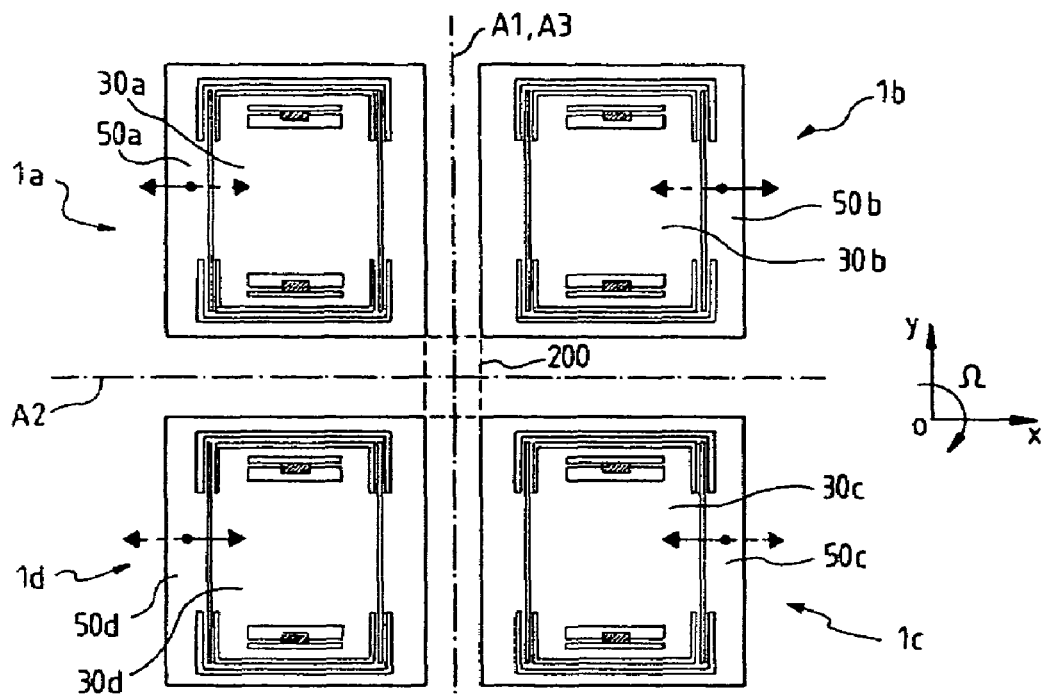
FIGS. 2a and 2b show schematically a first embodiment of a gyrometer according to the invention, the moving assemblies of which are placed at the vertices of a rectangle, the excitation and detection modes being illustrated in FIGS. 2a and 2b respectively.
Figure 2B:
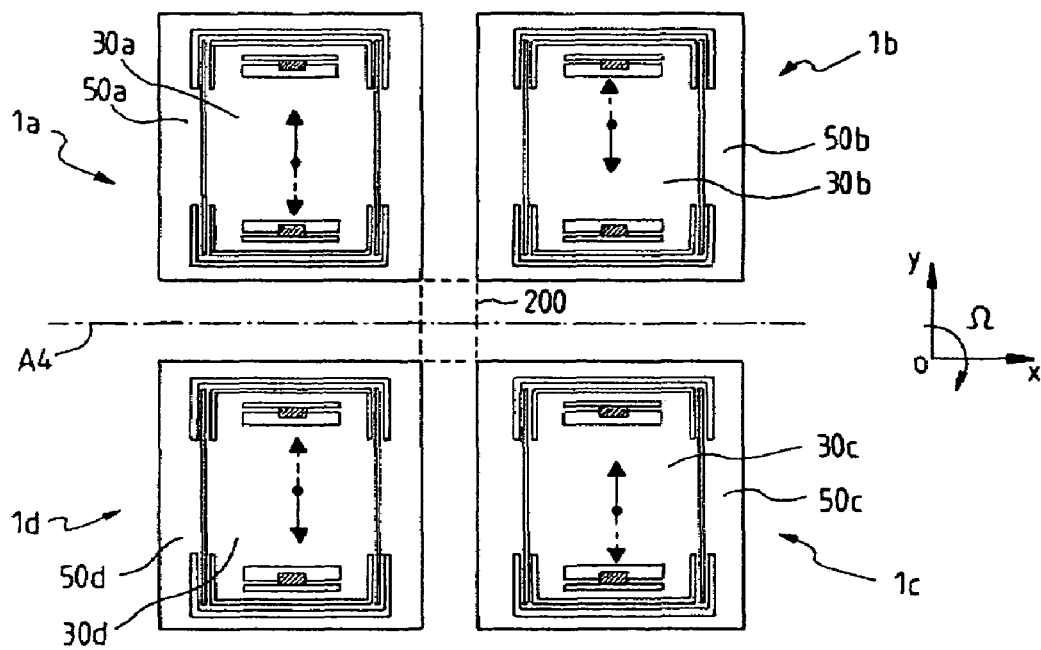

In a first embodiment, the inertial assemblies 1a, 1b, 1c, 1d are placed at the vertices of a virtual rectangle 200, the sides of which are parallel to Ox and Oy respectively, as shown in FIGS. 2a and 2b. The axes A1 and A2 are shown in these figures.

In the following, the indices a, b, c or d applied to the reference numerals will be used when it is useful to specify the position of the referenced elements with respect to the virtual rectangle 200.

The four inertial assemblies have an identical structure that is identified in general by the reference numeral 1.

An inertial assembly 1 will now be described in detail in relation to FIG. 3; certain elements are shown only in this figure in order not to overload the other figures.

The moving inertial mass, also denoted by detection mass 30 can move only in a detection direction, for example Oy (the vertical axis in the plane of the figure); the inertial frame 50 can move along the axis Oy and along an axis Ox perpendicular to Oy and also lying in the plane of the figure. The sensitive axis of the gyrometer is an axis Oz perpendicular to the plane of the wafer. A vibration of the inertial frame 50 in the Ox direction is excited; when the gyrometer rotates about its sensitive axis Oz, a vibration of the frame is generated along the axis Oy. This vibration along Oy is transmitted to the mass 30, whereas the vibration along Ox is not transmitted. As will be seen, a vibration excitation structure is associated with the frame 50 and a vibration detection structure is associated with the inertial detection mass 30. The coupling structure (not shown in FIG. 3) transmits the mechanical vibration energy of the inertial moving assembly from one side of the axis A3 and of the axis A4 to the other, both for the vibrations parallel to Ox and for the vibrations parallel to Oy, since this coupling structure is connected directly to the frames of the four inertial assemblies 1a, 1b, 1c, 1d that can vibrate along directions parallel to Ox and Oy.

Finally, whether in excitation mode or detection mode, each frame 50 is intended to vibrate in phase opposition with the frames 50 of the assemblies located at the two neighboring vertices of the rectangle, as illustrated in FIG. 2a in the case of the excitation mode. In detection mode, each detection mass 30 is intended to vibrate in phase opposition with the masses 30 of the assemblies located at the neighboring vertices of the rectangle, as illustrated in FIG. 2b.

As regards the vibrations themselves, the axis of symmetry A3 (relative to the excitation mode) shown in FIG. 2a is coincident with A1 and the axis of symmetry A4 (relative to the detection mode) shown in FIG. 2b is coincident with A2. In addition, the axis of the vibrations is perpendicular to the axes A3 or A4. Thus, the resultant of the forces transmitted to the support is zero, which provides good isolation of the secondary mode.

Figure 3:
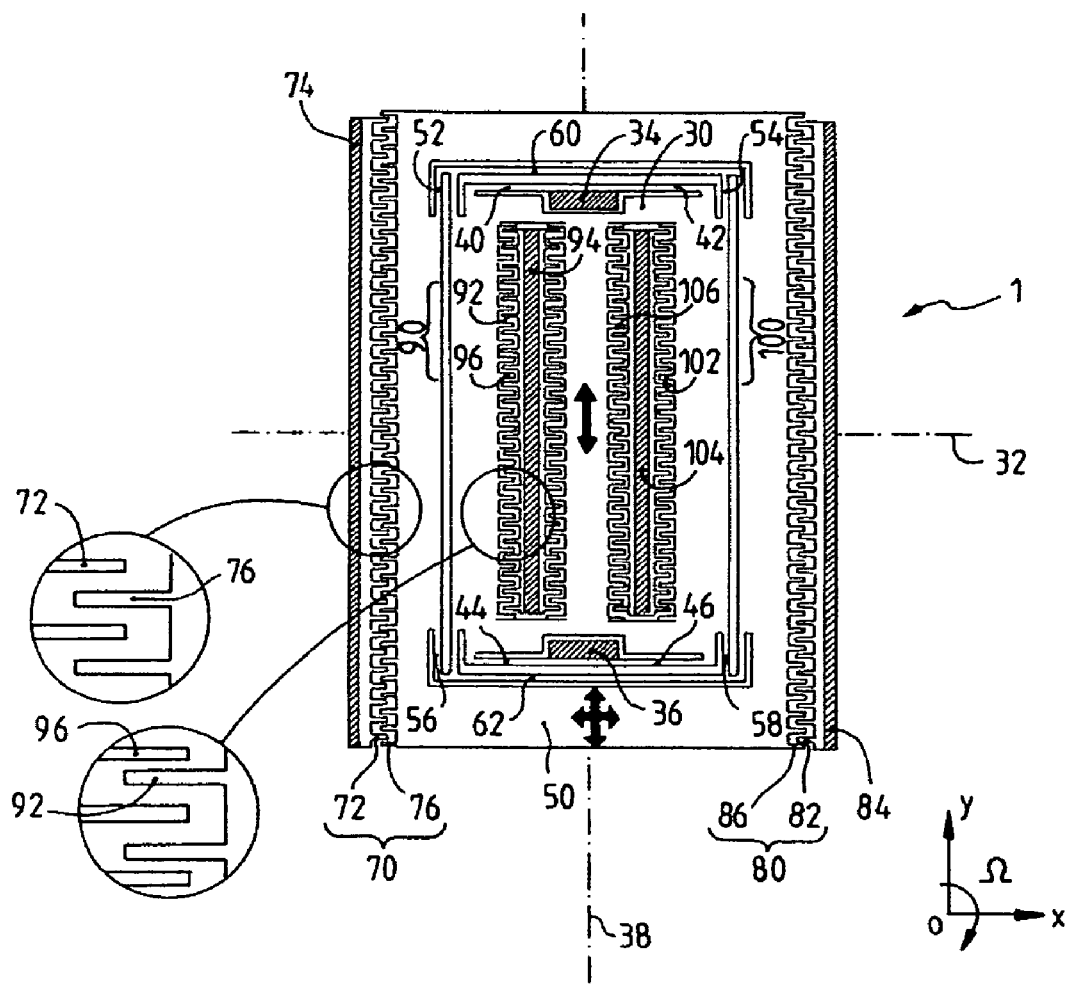
FIG. 3 shows schematically an inertial assembly in detail.

As may be seen in FIG. 3, the detection mass 30 is connected to fixed anchoring zones by at least two flexure arms designed to permit a displacement of the mass along Oy but to prevent any significant movement of the mass in the Ox direction. These arms are preferably located on either side of an axis of symmetry 32 of the mass, parallel to Ox. There are therefore two anchoring zones 34 and 36 located on either side of the detection mass, these being symmetrical with respect to this axis of symmetry 32. In addition, these zones are preferably located on another axis of symmetry 38 of the mass, which axis is parallel to Oy. The flexure arms that connect the mass 30 to the zones 34 and 36 are arms elongate in the Ox direction, so as to have a high stiffness (high resistance to elongation) in this direction. They are also very narrow, compared to their length, in order to have a low stiffness in the Oy direction perpendicular to Ox; this low stiffness permits a displacement of the mass along Oy.

To obtain both a high stiffness or resistance to elongation in one direction and a low stiffness in the perpendicular direction within the same plane, all that is required is for the arms to have an overall length of at least 5 times their width. These are relative stiffnesses, the absolute stiffness depending, of course, on the absolute dimensions of the arms.

There are preferably four flexure arms rather than two, the mass being connected to the anchoring zone 34 by two arms 40 and 42 lying along the extension of one with the other on either side of the zone 34; the mass is also connected to the second anchoring zone 36 by two arms 44 and 46 lying along the extension of one with the other on either side of the zone 36.

In practice, as may be seen in FIG. 3, to save space in the Oy direction without significantly reducing the length of the mass in this direction, a recess is made in the mass around the anchoring zone; to maximize the flexibility of the flexure arms in the Oy direction, while increasing the length/width ratio of these arms, each arm is connected, on one side, close to an end corner of the mass (the mass has in principle a generally rectangular shape) and on other side to the anchoring zone located on the axis of symmetry 38. It should be noted that it would also be conceivable to give the arms 40, 42, 44, 46 a folded shape with two branches elongate in the Oy direction, the arms then being attached to the mass closer to the central anchoring zone. It should also be noted that, instead of a central anchoring zone located at the middle of one side of the detection mass, it would be possible to have two anchoring zones located rather close to the end corners of the mass on either side of the axis 38.

Preferably, the moving frame 50 completely surrounds the mass 30. The mass 30 is connected to the frame 50 by at least two flexure arms which have the particular feature of having a very high stiffness (very high resistance to elongation) in the Oy direction and a low stiffness in the Ox direction. These arms are elongate in the Oy direction and have a small width compared with their length, so as to exhibit this difference in stiffnesses.

There are preferably four flexure arms of this type between the mass 30 and the frame 50, the arms being each located in practice at a corner of the detection mass if the latter is of a generally rectangular shape. They are placed symmetrically, on the one hand, with respect to the axis of symmetry 32 of the mass (an axis parallel to Ox) and, on the other hand, with respect to the axis of symmetry 38 (parallel to Oy).

These arms are denoted by the reference numerals 52, 54, 56, 58. Preferably, they are folded in the form of a U in order to reduce their longitudinal dimension by half, without significantly reducing their useful length, and therefore without significantly reducing the high ratio of their stiffness along Oy to their stiffness along Ox. The two U-folded branches are elongate parallel to Oy and are connected together by a short linking element. However, it would be possible for the arms 52 to 58 not to be folded, but to extend completely along the Oy direction between the frame and the mass. Folding makes it possible to save space without significantly modifying the desired mechanical properties.

If the arms are folded as in FIG. 3, it is also preferable to connect the short linking element (which connects the two U-shaped branches) of a first arm 52 to the corresponding short element of the arm 54, which is symmetrical to the arm 52 with respect to the axis 38. A crossmember 60 is provided for this purpose, parallel to Ox, in order to connect the bottom of the U of the linking arm 52 to the bottom of the U of the flexure arm 54, the arms 52 and 54 being symmetrical with respect to the axis 38. A similar crossmember 62, symmetrical to the crossmember 60 with respect to the axis 32, connects the symmetrical elements 56 and 58. These crossmembers 60 and 62, parallel to Ox, enhance the symmetry of transmission of a movement along Oy imposed on the mass 30 by the moving frame 50. They are not present if the arms 52, 54, 56, 58 do not have a folded shape since in this case the ends of the arms 52 and 54 would already be rigidly connected by the frame 50 itself.

As may be seen in FIG. 3, the folded shape in the form of an elongate U of the flexure arms between the moving frame 50 and the detection mass 30 is obtained by making recesses in the moving frame and in the detection mass, but in general the flexure arms go from close to an inner corner of the frame to a facing corner of the mass even if the effective point of attachment of the arm to the frame or to the mass does not exactly start from this corner. The mass may be considered as being suspended overall from the moving frame by its four corners.

The frame 50 is excited into vibration along Ox by a first interdigitated-comb structure 70 which comprises a fixed half-comb 72, attached to an anchoring zone 74, and a moving half-comb 76 formed along a first side (parallel to Oy) of the frame 50. The teeth or fingers of the fixed half-comb 72, made of conductive silicon machined at the same time as the other elements of the gyrometer, form the first plate of a capacitor and the teeth or fingers of the moving half-comb 76, also made of conductive silicon, form the second plate of this capacitor. Conventionally, the comb structure acts as an exciter, which excites the movement of the moving part thanks to the attractive forces that are exerted between the facing fingers when a voltage is applied between the half-combs. The excitation voltage is an AC voltage in order to generate a vibration movement, and the frequency of this voltage is chosen to be very close or equal to the mechanical resonant frequency of the structure. The excitation voltage is applied between the anchoring zone 74 and one or both of the anchoring zones 34 and 36. The fixed half-comb 72 is in direct electrical contact (via the conductive silicon body) with the anchoring zone 74; the moving half-comb 76 is in contact with the anchoring zones 34 and 36 via the flexure arms 52 to 58, via the body of the detection mass, via the flexure arms 40 to 46 and via the frame 50, so that, when a voltage is applied between the anchoring zone 74 and the anchoring zone 34 or anchoring zone 36, a voltage is in fact applied between the fixed part and the moving part of the comb 70.

The excitation movement generated on the frame 50 is along the Ox direction, the combs acting by modifying the area of mutual overlap of the interdigitated fingers.

Preferably, the microgyrometer has another interdigitated-comb structure associated with the frame, which is symmetrical to the structure 70 with respect to the axis 38. It comprises a fixed half-comb 82, attached to an anchoring zone 84, and a moving half-comb 86 machined along one side of the frame 50. This structure may serve for detecting the movement of the frame along Ox and is useful for being able to control the movement excited by the comb 70; in general, control is useful in order to adjust the excitation frequency with respect to the resonant frequency of the structure. The voltages detected by the structure 80 appear between the anchoring zone 84 and the anchoring zones 34 and 36.

At least one interdigitated comb is associated with the detection mass 30 in order to detect the movement of the detection mass in the Oy direction. The orientation of these combs depends on the principle upon which the detection is based: if detection is based upon a measurement of the changes in area of mutual overlap of the fingers of the fixed and moving half-combs, the detection comb for detecting movements along Oy is placed perpendicular to the excitation comb 70 (which is also based upon changes in the area of overlap). However, if detection is based upon a measurement of the changes in spacing between the fingers of the fixed half-comb and of the moving half-comb, the detection comb is placed parallel to the excitation comb. Detection by the change in spacing between fingers is preferred as it is more sensitive. The interdigitization of the combs is then unsymmetrical at rest, the fingers of one half-comb not being exactly in the middle of the gap between two fingers of the other half-comb, whereas a comb operating, (like the excitation comb) on the basis of changes in the areas of overlap has the fingers of one half-comb in the middle of the gap between the fingers of the other half-comb.

This is the case in FIG. 3: the detection combs are placed with the same general orientation as the combs 70 and 80, although they are associated with a movement along Oy, whereas the combs 70 and 80 are associated with a movement (excitation or detection) along Ox.

In the example shown in FIG. 3, the detection mass is associated with two identical interdigitated combs 90 and 100 that are placed parallel to the axis of symmetry 38 and on either side of this axis. These combs both act as a detector of the movement of the mass along Oy and it would be possible, as a variant, to be limited to a single comb placed at the center of the mass along the axis 38.

The comb 90 comprises a fixed half-comb 92, attached to an anchoring zone 94, and a moving half-comb 96 forming part of the detection mass itself. The detection mass has a recess so as to leave room for the fixed comb 92 and for the anchoring zone 94, and the edges of this recess are cut in the form of fingers in order to constitute the moving half-comb 96 with which the fingers of the fixed half-comb will interdigitate. In the example shown, the comb 90 is a double comb, that is to say two sides of the recess in the mass 30 are provided with fingers, and the fixed half-comb 92 has fingers on either side of the anchoring zone 94.

The interdigitated structure 100 is strictly symmetrical with the structure 90 and is formed in another recess of the detection mass 30. It comprises a fixed half-comb 102, an anchoring zone 104 and a moving half-comb 106.

To detect the movement along Oy, an electronic circuit associated with this structure detects the amplitude modulation of the electrical voltages present between the anchoring zone 94 and the anchoring zones 34 and 36, and/or between the zone 104 and the zones 34 and 36. This modulation is due only to a displacement of the detection mass along the axis Oy, since the mass can move only along this axis.

In the case of a conventional three-dimensional gyrometer architecture, the cross-shaped base visible in FIG. 1 provides the function of coupling between the various branches of the double tuning fork.

Figure 4:
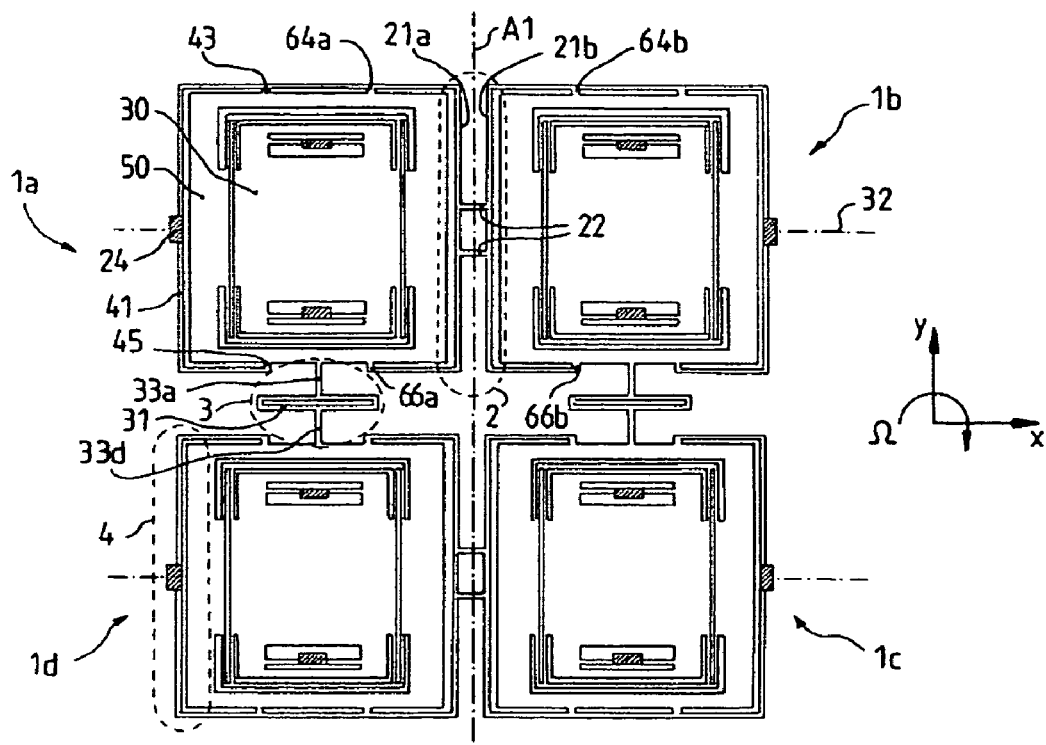
FIGS. 4, 5 and 6 show schematically various stiffness elements connected to the inertial assemblies of a microgyrometer according to the first embodiment.
Figure 5:
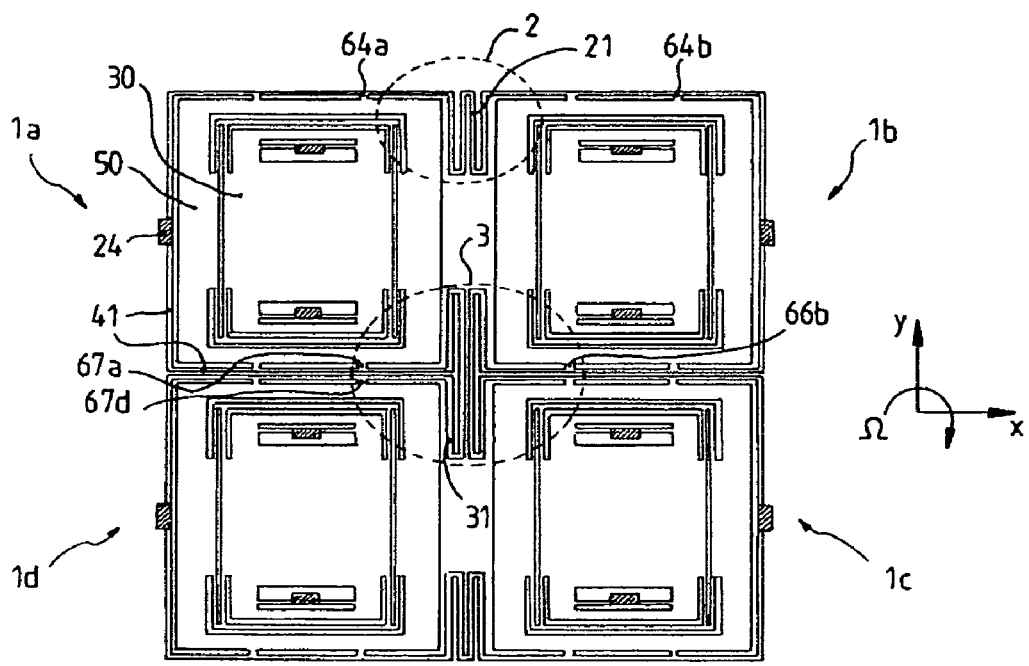
Figure 6:
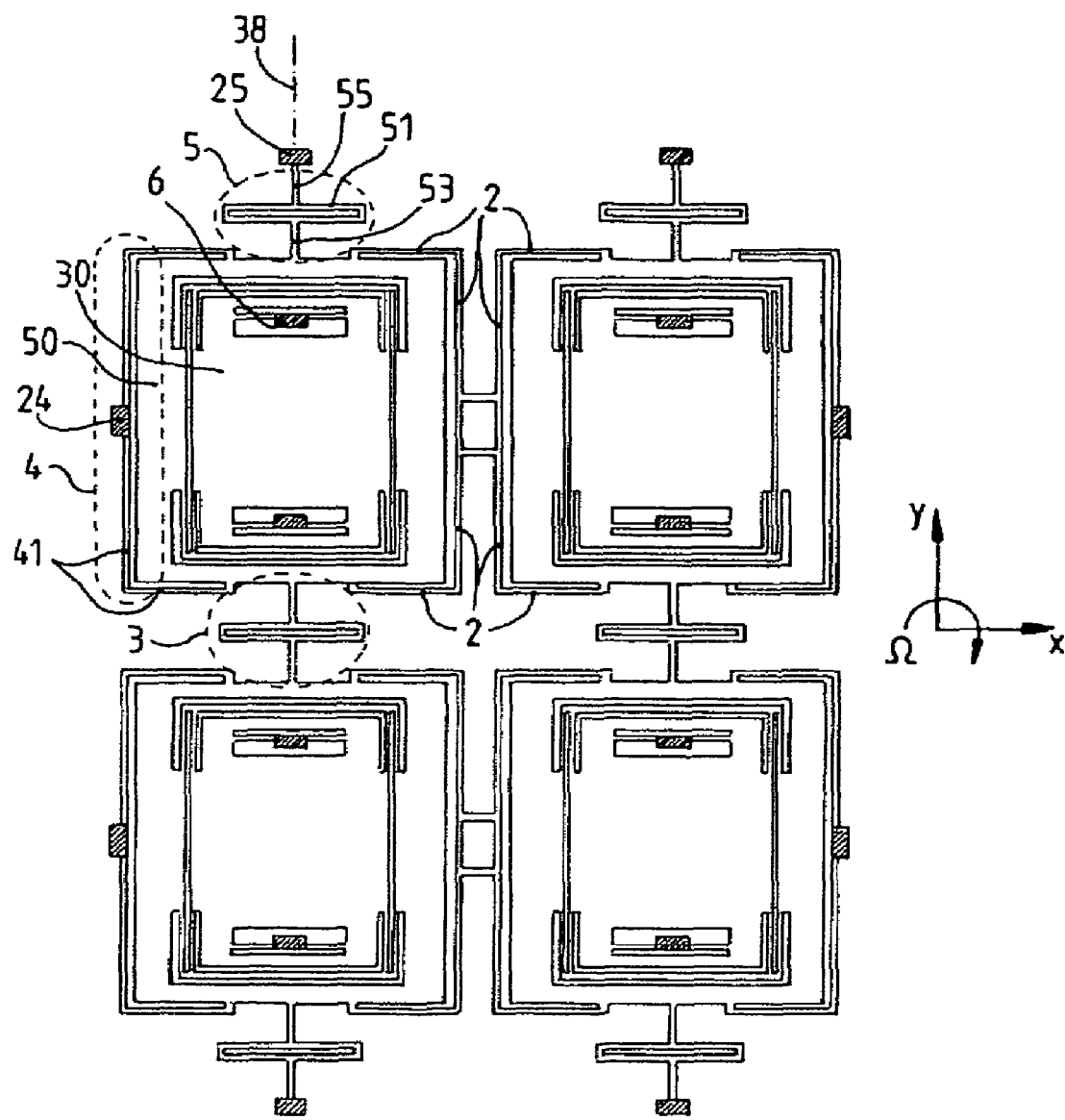

In the case of a two-dimensional architecture, the coupling structure is formed by two pairs of stiffness elements which provide the coupling both in the case of the excitation mode and in the case of the detection mode, and several examples of which are shown in FIGS. 4, 5 and 6, namely one pair of first stiffness elements 2 that can deform in a direction parallel to Ox and a direction parallel to Oy and allowing two moving assemblies 1a and 1b (or alternatively 1c and 1d) located at neighboring vertices of the rectangle to be connected parallel to Ox and one pair of second stiffness elements 3 that can deform in a direction parallel to Ox and a direction parallel to Oy and allowing two moving assemblies 1a and 1d (or alternatively 1b and 1c) located at neighboring vertices of the rectangle to be connected in a direction parallel to Oy.

These stiffness elements 2 and 3 can take various forms.

The first stiffness element 2 connecting the assemblies 1a and 1b will be described; however, it could just as well have been described with the indices a and b replaced by d and c respectively.

In FIGS. 4 and 6, the first stiffness element 2 comprises, for example, two U-shaped arms 21a and 21b which surround the inner side parallel to Oy of the moving assembly 1a, or alternatively 1b, and which are connected to the moving assembly by short linking arms 64a, 64b, 66a, 66b, located at the ends of the U, the arms 64 being symmetrical to the arms 66 with respect to the axis of symmetry 32. These short arms constitute almost rigid links through which the vibration energy along Ox and Oy of the frame 50a (and of the detection mass 30a) can pass to the coupling structure and therefore to the frame 50b (and the detection mass 30b). It also includes a two-bar linking element 22 that may be regarded as being rigid, which connects the two arms 21a and 21b together. The two-bar linking element 22 connects the side of the first arm 21a to the adjacent side of the second arm 21b. It is perpendicular to the axis A1 and centered on this axis. The short two-bar linking element 22 may be a single element or one reinforced with another short linking bar located in the middle of the two-bar element 22 and also centered on the axis A1. The greater or smaller separation between each of the bars constituting the two-bar linking element 22 allows a certain adjustment in the difference between the useful excitation and detection frequencies of the microgyrometer.

In another configuration, shown in FIG. 5, the first stiffness element 2 comprises a single arm 21 describing at least one crenel located between the two moving assemblies 1a and 1b, preferably toward the outside; the arm 21 is connected to each moving assembly by short linking arms 64a, 64b located at the ends of the arm 21.

The second stiffness element 3 will be described in relation to the assemblies 1a and 1d; however, it could just as well have been described by replacing the indices a and d with b and c, respectively.

In the example shown in FIG. 4, the second stiffness element 3 comprises an arm 31 in the form of a rectangle flattened along Ox, this being located between the two moving assemblies 1a and 1d, and, on either side of this flattened rectangle, two linking bars 33a and 33d that can deform in a direction parallel to Oy, each connecting the middle of one length of this flattened rectangle 31 to the middle of the side of the moving assembly 1a or alternatively 1d.

In another configuration, shown in FIG. 5, the second stiffness element 3 comprises an arm 31 preferably in the form of a recumbent T, the bar of the T being located toward the center of the four assemblies 1a, 1b, 1c and 1d in order to limit the separation between the two moving assemblies 1a and 1d, the arm being extended by two short rigid linking arms 67a, 67d each connecting the base of the T 31 to one of the two moving assemblies 1a, 1d.

These first and second stiffness elements 2 and 3 are not connected to fixed anchoring zones.

Each frame 50 is preferably connected to fixed anchoring zones by two stiffness elements, namely a third stiffness element 4, allowing the frame 50 to be connected to an anchoring zone 24 located on the outside of the moving assembly parallel to Oy along the axis 32, shown in FIGS. 4, 5 and 6, and a fourth stiffness element 5 allowing the frame to be connected to an anchoring zone 25 located on the outside of the moving assembly parallel to Ox located on the axis 38, shown in FIG. 6.

The third stiffness element 4 comprises a U-shaped arm 41 connected at the base of the U to the anchoring zone 24, which arm 41 surrounds the outer side parallel to Oy of the moving assembly; it is connected to the moving assembly by short rigid arms 43, 45 located at the ends of the U. One end of this third element 4 may optionally join one end of the first stiffness element 2 located toward the outside, as illustrated in FIGS. 4 and 5, and may optionally join one end of the second stiffness element 3, as illustrated in FIG. 5.

The fourth stiffness element 5, shown in FIG. 6, comprises an arm 51 in the form of a flattened rectangle parallel to Ox and, on either side of this flattened rectangle, two rigid linking bars 53, 55 connecting, in the case of one of them, the middle of a length of this flattened rectangle 51 to the anchoring zone 25, and the other one, connecting the middle of the other length of the flattened rectangle to the frame 50.

These third and fourth stiffness elements 4 and 5, associated with the stiffness elements 2 and 3, are dimensioned so that the stiffness moment acting on the frames 50 and produced by the excitation and/or detection vibrations is minimal, or even zero.

In the previous cases, the four moving assemblies were placed at the vertices of a virtual rectangle.

In another embodiment, they are placed at the vertex of a virtual square 300, the diagonals of which are parallel to Ox and Oy respectively, as may be seen in FIGS. 7 to 11.

Each moving assembly comprises an inertial detection mass 30 and a frame 50 as described in relation to FIG. 3.

Several configurations are possible.

Figure 7B:
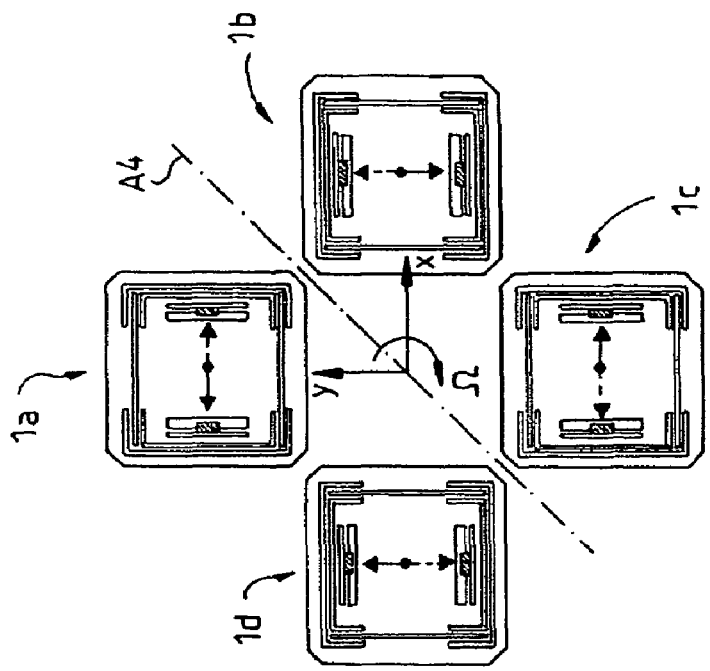
FIGS. 7a and 7b show schematically a second embodiment of a gyrometer according to the invention, the moving assemblies of which are placed at the vertices of a square and have a first orientation, the excitation and detection modes being illustrated in FIGS. 7a and 7b respectively.
Figure 7A:
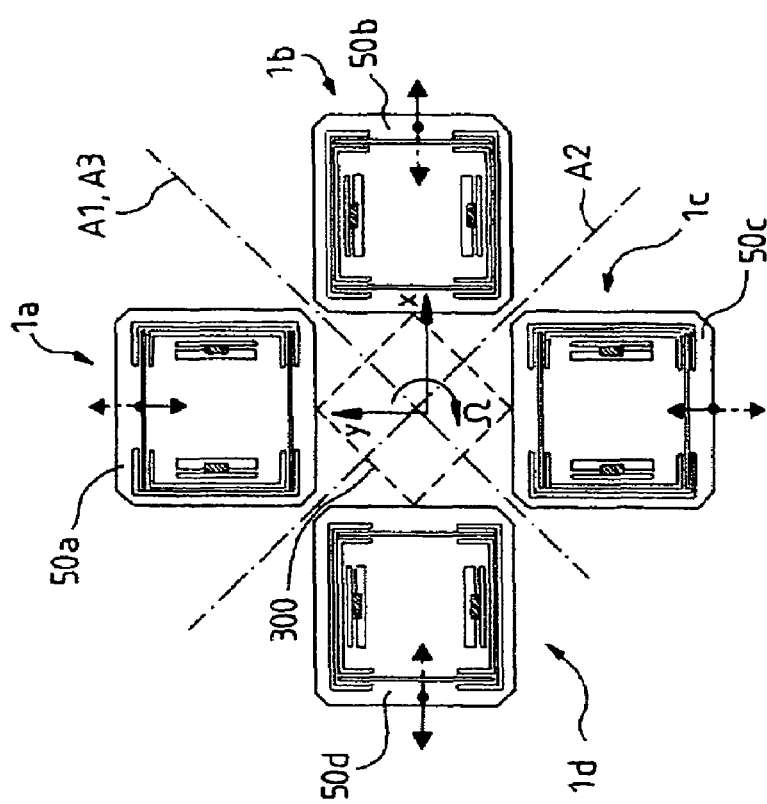

As illustrated in FIGS. 7a and 7b, the two virtual assemblies 1d and 1b located at the vertices of the diagonal along Ox may be oriented as previously, that is to say the excitation direction is parallel to Ox and the detection direction is parallel to Oy; however, the two other moving assemblies 1a and 1c located at the vertices of the diagonal along Oy have been pivoted through 90° with respect to the previous orientation, that is to say the excitation direction is parallel to Oy and the detection direction is parallel to Ox. This means that the moving assemblies are placed so that the excitation direction is parallel to Ox in the case of the two first elements 50*d* and 50*b* of the assemblies located at the vertices of the diagonal along Ox and so that the excitation direction is parallel to Oy in the case of the two first elements 50*a* and 50*c* of the assemblies located at the vertices of the diagonal along Oy.

Figure 8B:
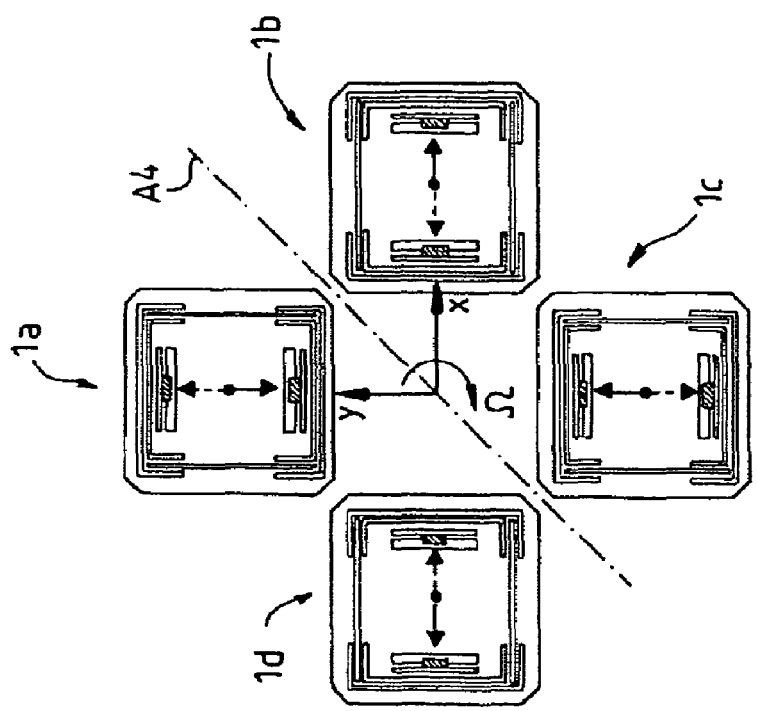
FIGS. 8a and 8b show schematically a second embodiment of a gyrometer according to the invention, the moving assemblies of which are placed at the vertices of a square and have a second orientation, the excitation and detection modes being illustrated in FIGS. 8a and 8b respectively.
Figure 8A:
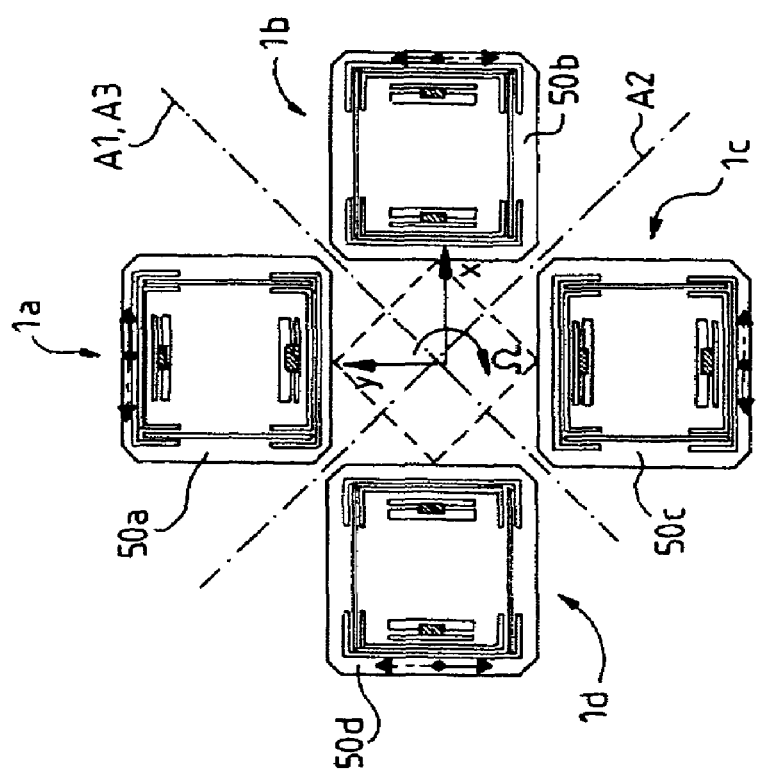

Another possible configuration is shown in FIGS. 8*a* and 8*b*. The two virtual assemblies 1*d* and 1*b* located at the vertices of the diagonal along Ox are oriented so that the excitation direction is parallel to Oy and the detection direction parallel to Ox; however, the two other moving assemblies 1*a* and 1*c* located at the vertices of the diagonal along Oy are oriented so that the excitation direction is parallel to Ox and the detection direction parallel to Oy. This means that the moving assemblies are arranged so that the excitation direction is parallel to Oy in the case of the two first elements 50*d* and 50*b* of the assemblies located at the vertices of the diagonal along Ox and so that the excitation direction is parallel to Ox in the case of the two first elements 50*a* and 50*c* of the assemblies located at the vertices of the diagonal along Oy.

In one or other of these configurations, the frames of the two assemblies 1*a* and 1*c* located at the vertices of the diagonal along Ox vibrate in phase opposition with one another, and the frames of the two other moving assemblies 1*b* and 1*d* located at the vertices of the diagonal along Oy also vibrate in phase opposition with each other.

The axes A1, A2, A3 and A4 are oriented at ±45° with respect to the axis Ox. Only the +45° orientation is shown in the figures. In addition, the axis A3 is also an axis of symmetry for the detection vibrations; likewise, the axis A4 is also an axis of symmetry for the excitation vibrations. In this embodiment, the axis of the vibrations is not perpendicular to the axis A3 or to the axis A4, but oriented at 45° with respect to these axes.

The coupling structure may take several forms for one or other of these configurations. Preferably, it comprises a single stiffness element 6 located at the center of the structure comprising the four moving assemblies 1*a*, 1*b*, 1*c* and 1*d*. It comprises a single arm 61 and four rigid linking bars 63*a*, 63*b*, 63*c* and 63*d* each connecting the arm 61 to one of the four moving assemblies 1*a*, 1*b*, 1*c* and 1*d*.

Figure 10:
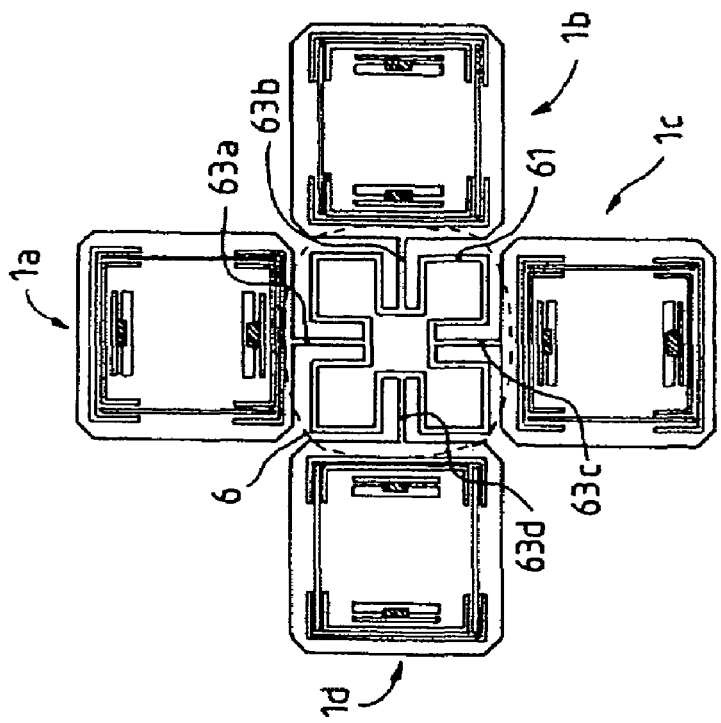
FIGS. 9, 10 and 11 show schematically various stiffness elements joined to the inertial assemblies of a microgyrometer according to the second embodiment.
Figure 9:
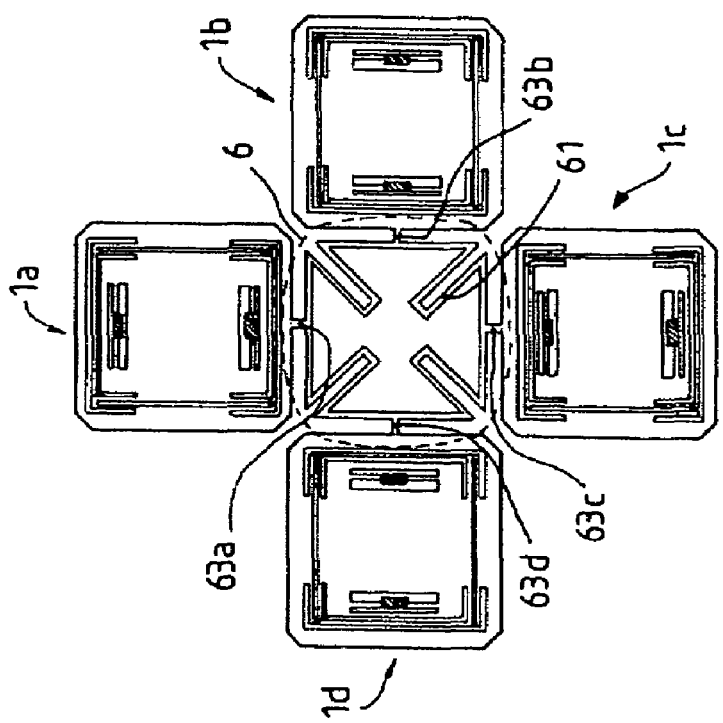

The arm 61 may be in the form of a Maltese cross, as in the example shown in FIG. 9, or in the form of a four-leaf clover, as in that shown in FIG. 10.

Figure 11:
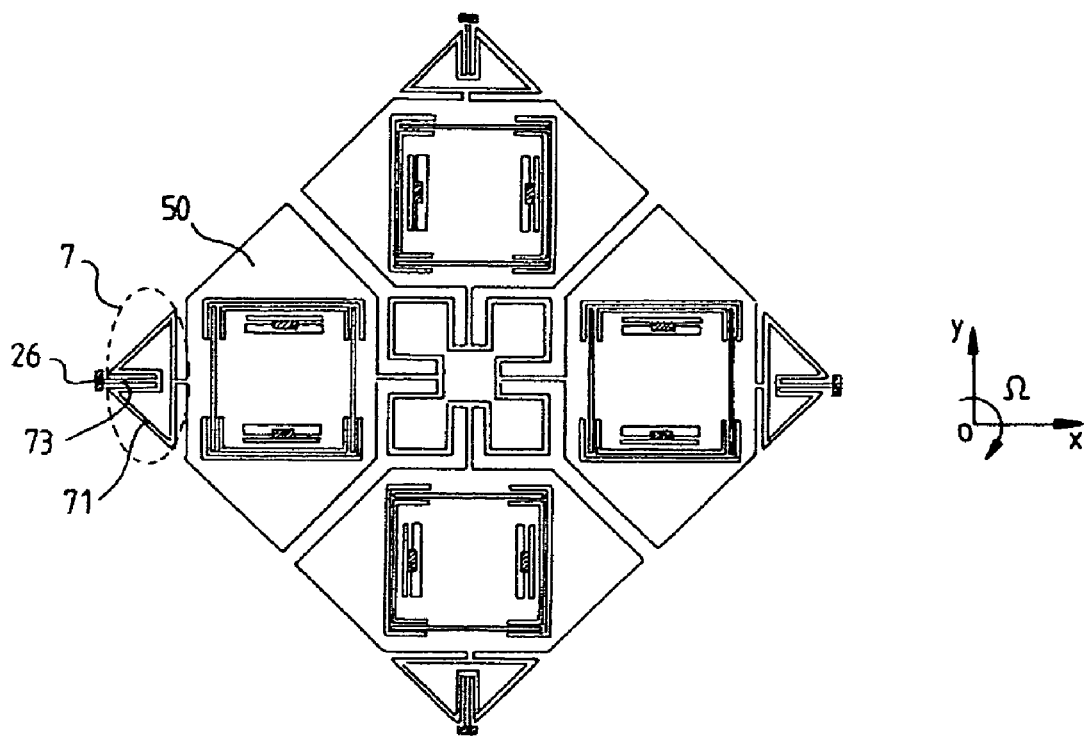

As shown in FIG. 11, each frame 50 is preferably connected by a sixth stiffness element 7 to a fixed anchoring zone 26 located toward the outside of the structure comprising the four moving assemblies. The sixth stiffness element 7 comprises, for example, a single arm 71 in the form of an isosceles triangle, the base of which is parallel to the side of the moving assembly and the vertex of which, on the opposite side to this base, points toward the anchoring zone 26. This vertex is in the form of a crenel directed toward the inside of the triangle. This arm 71 is connected to the anchoring zone at the crenel by a rigid linking bar 73.

These sixth stiffness elements 7, associated with the stiffness element 6, are dimensioned so that the stiffness moment acting on the frames 50 and produced by the excitation and/or detection vibrations is minimal, or even zero.

Figure 12:
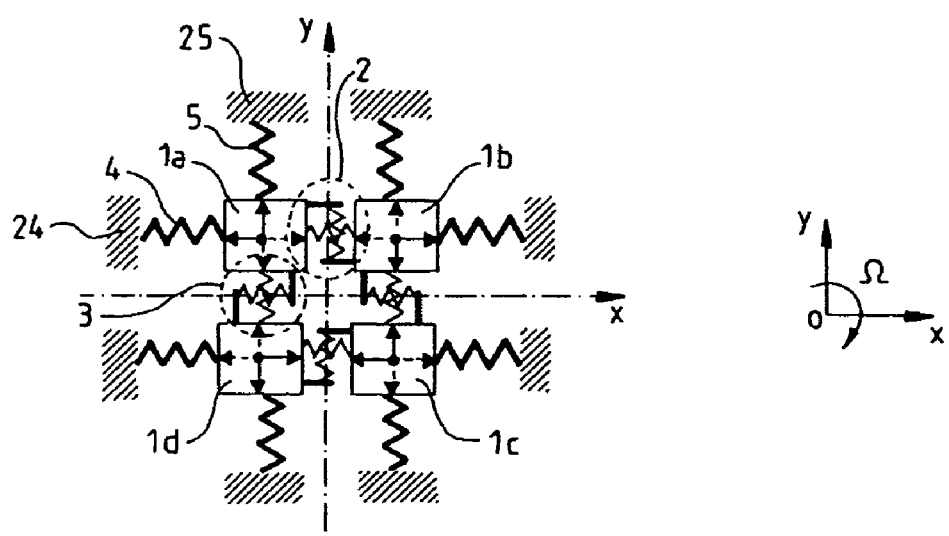
FIG. 12 shows schematically one particular embodiment of a gyrometer according to the invention, the moving assemblies of which are placed at the vertices of a rectangle.

One particular embodiment of a configuration in a virtual rectangle is shown in FIG. 12. The inertial first moving element and the second moving element coincide in the moving assembly 1 connected to the coupling structure and to anchoring zones. The coupling structure comprises stiffness elements 2 and 3 that can deform along Ox and Oy. Each moving assembly 1 is connected to an anchoring zone 24 by a stiffness element 4 that can deform along Ox and to an anchoring zone 25 by a stiffness element 5 that can deform along Oy.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A gyrometer based on a planar vibrating structure, comprising:
    four moving assemblies placed at the vertices of a virtual rectangle in order to allow a rotation measurement with minimal perturbations due to an excitation movement,
    each moving assembly being coupled to two moving assemblies located at neighboring vertices via a coupling structure in order to allow transfer of mechanical vibration energy between them, each moving assembly including
    a first inertial moving element connected to the coupling structure and intended to vibrate in two orthogonal directions in the plane of the vibrating structure, a first direction, called the excitation direction, and
    a second direction, called the detection direction, a second moving element intended to vibrate in the detection direction without permitting movement of the second element in the excitation direction and connected, on one side, to the first moving element, and, on the other side, to anchoring zones via linking means which allow transmission to the second moving element of the vibration movement of the first moving element in the detection direction.

2. The gyrometer as claimed in claim 1, wherein the first moving element is a frame surrounding the second moving element called the detection mass.

3. The gyrometer as claimed in claim 2, wherein the frame is substantially rectangular.

4. The gyrometer as claimed in claim 2, wherein the detection mass is connected to the frame by at least two straight and elongate first flexure arms which have a high resistance to elongation in the detection direction and a low stiffness in the excitation direction, and the detection mass is connected to at least one anchoring zone by at least two second narrow and elongate flexure arms which have a high resistance to elongation in the excitation direction and a low stiffness in the detection direction.

5. The gyrometer as claimed in claim 1, wherein each moving assembly is connected to at least one anchoring zone located toward the outside of the vibrating structure comprising the four moving assemblies via at least one stiffness element.

6. The gyrometer as claimed in claim 1, wherein the sides of the rectangle are parallel to Ox and Oy respectively.

7. The gyrometer as claimed in claim 6, wherein the excitation direction of each first moving element is parallel to Ox.

8. The gyrometer as claimed in claim 7, wherein each first moving element is intended to vibrate in phase opposition with the first elements located at the neighboring vertices of the virtual rectangle and wherein each second moving element is intended to vibrate in phase opposition with the second elements located at the neighboring vertices of the virtual rectangle.

9. The gyrometer as claimed in claim 6, wherein an axis of symmetry A3 lies in the plane of the vibrating structure and along Oy, such that the excitation vibrations of the first moving elements of two moving assemblies that are located on one side of the axis A3 are symmetrical with respect to the excitation vibrations of the first moving elements of the two other moving assemblies tat are located on the other side of this axis A3.

10. The gyrometer as claimed in claim 6, wherein an axis of symmetry A4 lies in the plane of the vibrating structure and along Ox, such that the detection vibrations of the second moving elements of two moving assemblies that are located on one side of the axis A4 are symmetrical with respect to the detection vibrations of the second moving elements of the two other moving assemblies that are located on the other side of this axis A4.

11. The gyrometer as claimed in claim 6, which includes a pair of first stiffness elements can deform in directions parallel to Ox and Oy respectively, each first stiffness element connecting, parallel to Ox, two moving assemblies that are located at neighboring vertices of the virtual rectangle.

12. The gyrometer as claimed in claim 6, which includes a pair of second stiffness elements can deform in directions parallel to Ox and Oy respectively, each second stiffness element connecting, parallel to Oy, two moving assemblies that are located at neighboring vertices of the virtual rectangle.

13. The gyrometer as claimed in claim 6, wherein each moving assembly is connected to a first outer anchoring zone by a third stiffness element that can deform in directions parallel to Ox and Oy respectively, comprising a U-shaped arm which surrounds the outer side parallel to Oy of each moving assembly and which is connected to the moving assembly by short rigid links located at the ends of the U.

14. The gyrometer as claimed in claim 6, wherein each moving assembly is connected to a second outer anchoring zone by a fourth stiffness element that can deform in directions parallel to Ox and Oy respectively, which comprises an arm in the form of a flattened rectangle parallel to Ox and, on either side of the rectangle, a deformable link connecting the middle of each length of the flattened rectangle, on the one hand, to the second anchoring zone, and on the other hand, to the moving assembly.

15. The gyrometer as claimed in claim 1, wherein the rectangle is a square and wherein the diagonals of the square are parallel to Ox and Oy respectively.

16. The gyrometer as claimed in claim 15, wherein the moving assemblies are arranged so that the excitation direction is parallel to Ox in the case of two first elements located at the vertices of the diagonal along Ox and is parallel to Oy in the case of the two first elements located at the vertices of the diagonal along Oy.

17. The gyrometer as claimed in claim 15, wherein the moving assemblies are placed so that the excitation direction is parallel to Oy in the case of two first elements located at the vertices of the diagonal along Ox and is parallel to Ox in the case of the two first elements located at the vertices of the diagonal along Oy.

18. The gyrometer as claimed in claim 15, wherein each first moving element undergoing an excitation movement is intended to vibrate in phase opposition with the first moving element located at the opposite vertex of the square and wherein each second moving element undergoing a detection movement is intended vibrate in phase opposition with the second moving element located at the opposite vertex of the square.

19. The gyrometer as claimed in claim 15, which has an axis of symmetry A3 lying in the plane of the vibrating structure and oriented at ±45° with respect to Ox, such tat the excitation vibrations of the first moving elements of two moving assemblies that are located on one side of the axis A3 are symmetrical with respect to the excitation vibrations of the first moving elements of the two other moving assemblies located on the other side of this axis A3.

20. The gyrometer as claimed in claim 15, which has an axis of symmetry A4 lying in the plane of the vibrating structure and oriented at ±45° with respect to Ox, such that the detection vibrations of the second moving elements of two moving assemblies that are located on one side of the axis A4 are symmetrical with respect to the detection vibrations of the second moving elements of the two other moving assemblies that are located on the other side of this axis A4.

21. The gyrometer as claimed in claim 1, wherein the inertial first moving element and the second moving element coincide in the moving assembly I, the four moving elements being arranged at the vertices of a virtual rectangle, the sides of which are parallel to Ox and Oy respectively, each moving assembly being connected to the coupling structure that comprises stiffness elements that can deform in directions parallel to Ox end Oy respectively, each moving assembly I being connected to an anchoring zone 24 by a stiffness element 4 that can deform in a direction parallel to Ox and to an anchoring zone 25 by a stiffness element 5 that can deform in a direction parallel to Oy.

* * * * *